(12) United States Patent
Gaffney et al.

(10) Patent No.: US 8,485,612 B2
(45) Date of Patent: Jul. 16, 2013

(54) METHOD AND SYSTEM FOR CONTROLLING VEHICLE BRAKING

(75) Inventors: Edmund F. Gaffney, White Lake, MI (US); James Heath Holbrook, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 12/815,185

(22) Filed: Jun. 14, 2010

(65) Prior Publication Data
US 2011/0303497 A1    Dec. 15, 2011

(51) Int. Cl.
*B60T 8/64*    (2006.01)

(52) U.S. Cl.
USPC .......................................................... 303/151

(58) Field of Classification Search
USPC .................... 303/151, 152; 180/65.21, 65.31, 180/65.51
See application file for complete search history.

(56) References Cited

U.S. PATENT DOCUMENTS

| | | | |
|---|---|---|---|
| 5,632,534 A * | 5/1997 | Knechtges | 303/152 |
| 7,841,433 B2 * | 11/2010 | Soliman et al. | 180/65.21 |
| 7,848,857 B2 * | 12/2010 | Nasr et al. | 701/22 |
| 8,006,790 B2 * | 8/2011 | Kimura et al. | 180/65.6 |
| 2004/0090116 A1 * | 5/2004 | Tsunehara | 303/152 |

FOREIGN PATENT DOCUMENTS

DE    4446219 A1    6/1996

OTHER PUBLICATIONS

Translation of DE 4446219A1, Dec. 23, 1994.*

* cited by examiner

*Primary Examiner* — Thomas J Williams
(74) *Attorney, Agent, or Firm* — Ingrassia Fisher & Lorenz, P.C.

(57) ABSTRACT

Methods and systems for controlling braking in a vehicle are provided, for example in a vehicle in which regenerative braking is provided using a motor capable of providing regenerative braking on one axle or wheel that does not have a friction brake component. If it is determined that the energy storage system of the vehicle cannot accept additional electrical energy created by the regenerative braking, the electrical energy is transferred to another location such as a motor on another axle or wheel, resulting in a propulsion torque on that axle. In order to maintain the total desired braking consistent with the driver command, friction braking is provided on the axle the regenerative braking energy is transferred to using a friction braking component, based in part upon the amount of propulsion torque, when the energy storage system cannot accept additional electrical energy.

20 Claims, 3 Drawing Sheets

METHOD AND SYSTEM FOR CONTROLLING VEHICLE BRAKING

TECHNICAL FIELD

The disclosed subject matter generally relates to the field of vehicles and, more specifically, to methods and systems for controlling braking in vehicles, such as in fuel cell, electric, or hybrid electric vehicles.

BACKGROUND

Automobiles and various other vehicles include braking systems for reducing vehicle speed or bringing the vehicle to a stop. Such braking systems generally include a controller that regulates the delivery of braking pressure to braking calipers on one or both axles of the vehicle to produce braking torque for the vehicle.

Various vehicles, such as certain fuel cell, electric, and hybrid electric vehicles, utilize regenerative braking in addition to friction braking. While such vehicles typically have front and rear friction brake calipers in addition to regenerative braking, some fuel cell, electric, and hybrid electric vehicles may have friction brake calipers only on a single axle, and thus may rely solely on regenerative braking on the other axle. Such a case may include, without limitation, a vehicle having four wheel motors that are situated on the vehicle so as to provide propulsion and braking at the four corners of the vehicle.

Thus, certain fuel cell, electric, or hybrid electric vehicles may have friction braking that is limited to one axle, and regenerative braking that is available on both axles. During regenerative braking, electrical energy is generated and stored in an energy storage system. However, in certain situations, the energy storage system may be offline and/or may be otherwise unable to accept additional electrical energy.

Accordingly, it is desirable to provide an improved method and system for controlling braking in a vehicle, such as a fuel cell, electric, or hybrid electric vehicle, that can be used when the energy storage system of the vehicle cannot accept additional electrical energy, for example to allow braking on an axle that is not equipped with friction brakes. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method for controlling braking in a vehicle having an energy storage system, a regenerative braking component, and a friction braking component is provided. The method comprises the steps of providing regenerative braking, determining an amount of a propulsion resulting from the regenerative braking if the energy storage system cannot accept a predetermined amount of additional electrical energy, and providing friction braking based in part upon the amount of the propulsion if the energy storage system cannot accept the predetermined amount of additional electrical energy.

In accordance with another exemplary embodiment, a system for controlling braking in a vehicle having an energy storage system is provided. The system comprises a motor, a friction braking component, and a controller. The motor is configured to provide regenerative braking based on regenerative braking instructions. The friction braking component is configured to provide friction braking based on friction braking instructions. The controller is coupled to the motor and the friction braking component. The controller is configured to provide the regenerative braking instructions to the motor, determine an amount of propulsion torque resulting from the regenerative braking if the energy storage system cannot accept a predetermined amount of additional electrical energy, and provide the friction braking instructions to the friction braking component based in part upon the amount of propulsion torque if the energy storage system cannot accept the predetermined amount of additional electrical energy.

In accordance with a further exemplary embodiment, a system for controlling braking torque in a vehicle having a first axle and a second axle is provided. The system comprises an energy storage system, a regenerative braking component, a friction braking component, and a controller. The regenerative braking component is configured to provide regenerative braking based on regenerative braking instructions. The friction braking component is configured to provide friction braking based on friction braking instructions. The controller is in operative communication with the energy storage system, the regenerative braking component, and the friction braking component. The controller is configured to provide the regenerative braking instructions to the regenerative braking component, determine an amount of a propulsion resulting from the regenerative braking if the energy storage system cannot accept a predetermined amount of additional electrical energy, and provide the friction braking instructions to the friction braking component based in part upon the amount of the propulsion if the energy storage system cannot accept the predetermined amount of additional electrical energy.

Furthermore, other desirable features and characteristics of the method and systems will be apparent from the subsequent detailed description and the appended claims, taken in conjunction with the accompanying drawings and the foregoing technical field and background.

BRIEF DESCRIPTION OF THE DRAWINGS

Certain embodiments of the present invention will hereinafter be described in conjunction with the following drawing figures, wherein like numerals denote like elements, and wherein.

DETAILED DESCRIPTION

Figure 1:
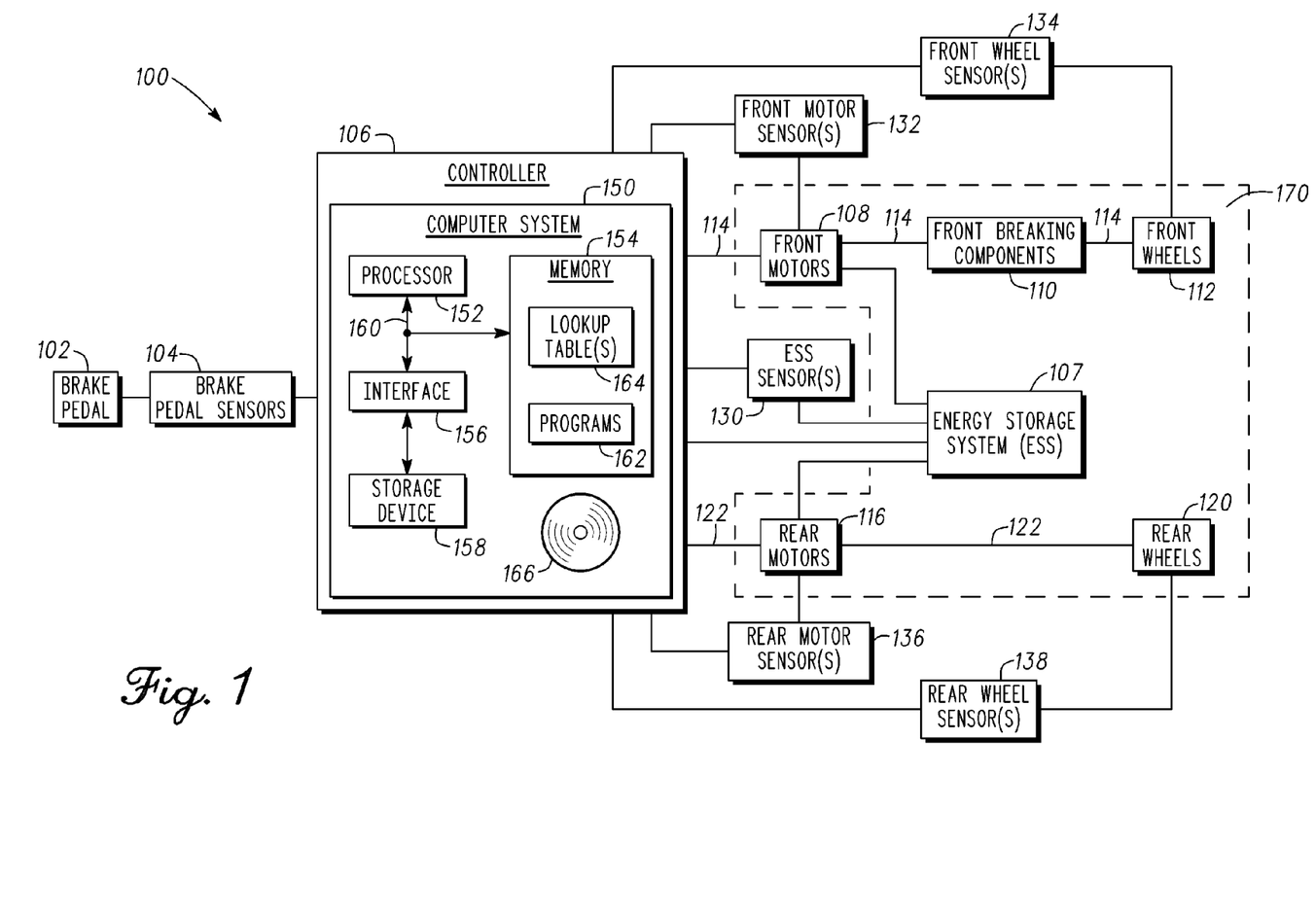
FIG. 1 is a functional block diagram of a braking system for a vehicle, such as hybrid electric, fuel cell, or electric vehicle applications, in accordance with an exemplary embodiment.

The following detailed description is merely exemplary in nature, and is not intended to limit the application and uses thereof. Furthermore, here is no intention to be bound by the preceding background of the invention or the following detailed description. FIG. 1 is a block diagram of an exemplary braking system 100 for use in a brake-by-wire system of a vehicle, such as an electric, hybrid electric, or fuel cell vehicle application. The braking system 100 provides regenerative braking and friction braking in accordance with a driver intended braking torque. In addition, the braking system 100 allows for regenerative braking in situations in which an energy storage system is offline or cannot otherwise accept at least a predetermined amount of additional electrical energy. As used throughout the detailed description, the energy storage system is considered to not be able to accept additional energy if it is not able to accept at least a predetermined amount of electrical energy generated via regenerative braking. In a preferred embodiment, the vehicle is an automobile, such as a sedan, a sport utility vehicle, a van, or a truck. However, the type of vehicle may vary.

As depicted in FIG. 1, the braking system 100 includes a brake pedal 102, one or more brake pedal sensors 104, a controller 106, and an energy storage system (ESS) 107. The braking system 100 further includes one or more front motors 108, front braking components 110, and front wheels 112 along a front axle 114, and one or more rear motors 116, and rear wheels 120 along a rear axle 122. The energy storage system 107, the front motors 108, the front braking components 110, the front wheels 112, the rear motors 116, and the rear wheels 120 are also designated in FIG. 1 as a sub-system 170 for further reference in connection with FIG. 2. In the depicted embodiment, the braking system 100 also includes one or more energy storage system (ESS) sensors 130, front motor sensors 132, front wheel sensors 134, rear motor sensors 136, and rear wheel sensors 138.

The brake pedal 102 provides an interface between an operator of a vehicle and the braking system 100, which is used to slow or stop the vehicle. To initiate the braking system 100, an operator would typically use his or her foot to apply a force to the brake pedal 102 to move the brake pedal 102 in a generally downward direction. The braking system 100 may include an electro-hydraulic system, electro-mechanical system, or a hydraulic system, by way of examples.

The brake pedal sensors 104 are coupled between the brake pedal 102 and the controller 106. The brake pedal sensors 104 preferably include one or more brake pedal force sensors and/or one or more brake pedal travel sensors. The number of brake pedal sensors 104 may vary. For example, in certain embodiments, the braking system 100 may include a single brake pedal sensor 104. In various other embodiments, the braking system 100 may include any number of brake pedal sensors 104.

The brake pedal travel sensors, if any, of the brake pedal sensors 104 provide an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved.

The brake pedal force sensors, if any, of the brake pedal sensors 104 determine how much force the operator of braking system 100 is applying to the brake pedal 102, which is also known as brake pedal force. In one exemplary embodiment, such a brake pedal force sensor, if any, may include a hydraulic pressure emulator and/or a pressure transducer, and the brake pedal force can be determined by measuring hydraulic pressure in a master cylinder of the braking system 100.

Regardless of the particular types of brake pedal sensors 104, the brake pedal sensors 104 detect one or more values (such as brake pedal travel and/or brake pedal force) pertaining to the drivers' engagement of the brake pedal 102. The brake pedal sensors 104 also provide signals or information pertaining to the detected values pertaining to the driver's engagement of the brake pedal 102 to the computer system 150 for processing by the computer system 150 in determining the driver intended braking torque for the vehicle.

The controller 106 is coupled to the energy storage system (ESS) 107, the various sensors 104, 130, 132, 134, 136, 138, motors 108, 116, and braking components 110. Specifically, the controller 106 receives information regarding a driver's engagement of the brake pedal from the brake pedal sensors 104 and processes this information in determining a driver requested braking torque. The controller 106 also receives information regarding a state of the energy storage system (ESS) 107 from the ESS sensors 130 for use in determining whether the energy storage system 107 can accept additional electrical energy. The controller 106 calculates the amount of braking torque required to overcome the propulsion torque transferred to the front motors by the rear regenerative braking if the energy storage system 107 cannot accept additional electrical energy.

As used throughout this description, the propulsion refers to a propulsion of the vehicle and/or wheels thereof caused by excess electrical generated from regenerative braking that cannot be stored in the energy storage system 107, and that is thus transferred from one or more rear motors 116 to one or more front motors 108 for dissipation via friction braking that counteracts the propulsion. The controller 106 calculates the amount of propulsion based on wheel movement information received from the front wheel sensors 134 and/or the rear wheel sensors 138 and/or from motor power or torque information received from the front motor sensors 132 and/or the rear motor sensors 136. In one embodiment, the amount of propulsion comprises a value of wheel and/or vehicle movement, velocity, and/or acceleration. In other embodiments. The amount of propulsion comprises a measure of energy transferred between motors 116, 108. In yet other embodiments, the amount of propulsion comprises a measure of torque from the front motors 116 resulting from the energy transferred. The controller 106 controls braking by providing instructions to the front motors 108, the front braking components 110, and the rear motors 116 along the front and rear axles 114, 122, respectively, based on the various calculations, as described in greater detail further below.

In certain embodiments, multiple controllers (each preferably comprising different respective computer systems and/or processors) may be utilized in conjunction with the braking system 100. For example, in certain embodiments, the energy storage system 107 may have a separate energy storage system controller (not depicted in FIG. 1). In yet other embodiments, the braking system 100 may be coupled to one or more other vehicle systems or sub-systems (also not depicted in FIG. 1) with different controllers, computer systems, and/or processors.

As depicted in FIG. 1, the controller 106 comprises a computer system 150. The computer system 150 includes a processor 152, a memory 154, an interface 156, a storage device 158, and a bus 160. The processor 152 performs the computation and control functions of the computer system 150 and the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 152 executes one or more programs 162 contained within the memory 154 and, as such, controls the general operation of the controller 106 and the computer system 150, preferably in executing the steps of the processes described herein, such as the process 300 depicted in FIG. 3 and described further below in connection therewith.

The memory 154 can be any type of suitable memory. This would include the various types of dynamic random access memory (DRAM) such as SDRAM, the various types of static RAM (SRAM), and the various types of non-volatile memory (PROM, EPROM, and flash). The bus 160 serves to transmit programs, data, status and other information or signals between the various components of the computer system 150. In a preferred embodiment, the memory 154 stores the above-referenced program 162 along with one or more look up tables 164 that are used in controlling braking for the vehicle in accordance with steps of the process 300 depicted in FIG. 3 and described further below in connection therewith.

The interface 156 allows communication to the computer system 150, for example from a system driver and/or another computer system, and can be implemented using any suitable method and apparatus. It can include one or more network interfaces to communicate with other systems or components. The interface 156 may also include one or more network interfaces to communicate with technicians, and/or one or more storage interfaces to connect to storage apparatuses, such as the storage device 158.

The storage device 158 can be any suitable type of storage apparatus, including direct access storage devices such as hard disk drives, flash systems, floppy disk drives and optical disk drives. In one exemplary embodiment, the storage device 158 comprises a program product from which memory 154 can receive a program 162 that executes one or more of the processes described herein, such as the process 300 of FIG. 3 or portions thereof. In another exemplary embodiment, the program product may be directly stored in and/or otherwise accessed by the memory 154 and/or a disk, such as that referenced below.

The bus 160 can be any suitable physical or logical means of connecting computer systems and components. This includes, but is not limited to, direct hard-wired connections, fiber optics, infrared and wireless bus technologies. During operation, the program 162 is stored in the memory 154 and executed by the processor 152.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable media used to carry out the distribution. Examples of computer-readable media include: recordable media such as floppy disks, hard drives, memory cards and optical disks (e.g., disk 166). It will similarly be appreciated that the computer system 150 may also otherwise differ from the embodiment depicted in FIG. 1, for example in that the computer system 150 may be coupled to or may otherwise utilize one or more remote computer systems and/or other control systems.

The energy storage system (ESS) 107 (for example, a battery) captures electrical energy from the motors 108, 116 during regenerative braking as kinetic energy is transformed into electrical energy. The energy storage system 107 preferably serves as a hybrid traction energy storage system for the motors 108, 116 and the regenerative power or energy that is captured is used at a later time for traction power.

The ESS sensors 130 are coupled between the energy storage system 107 and the controller 106. The ESS sensors 130 are configured to detect a state of the energy storage system 107 and to provide information (preferably, signals) to the controller 106 regarding the state for use in determining whether the energy storage system 107 can accept additional electrical energy.

Figure 2:
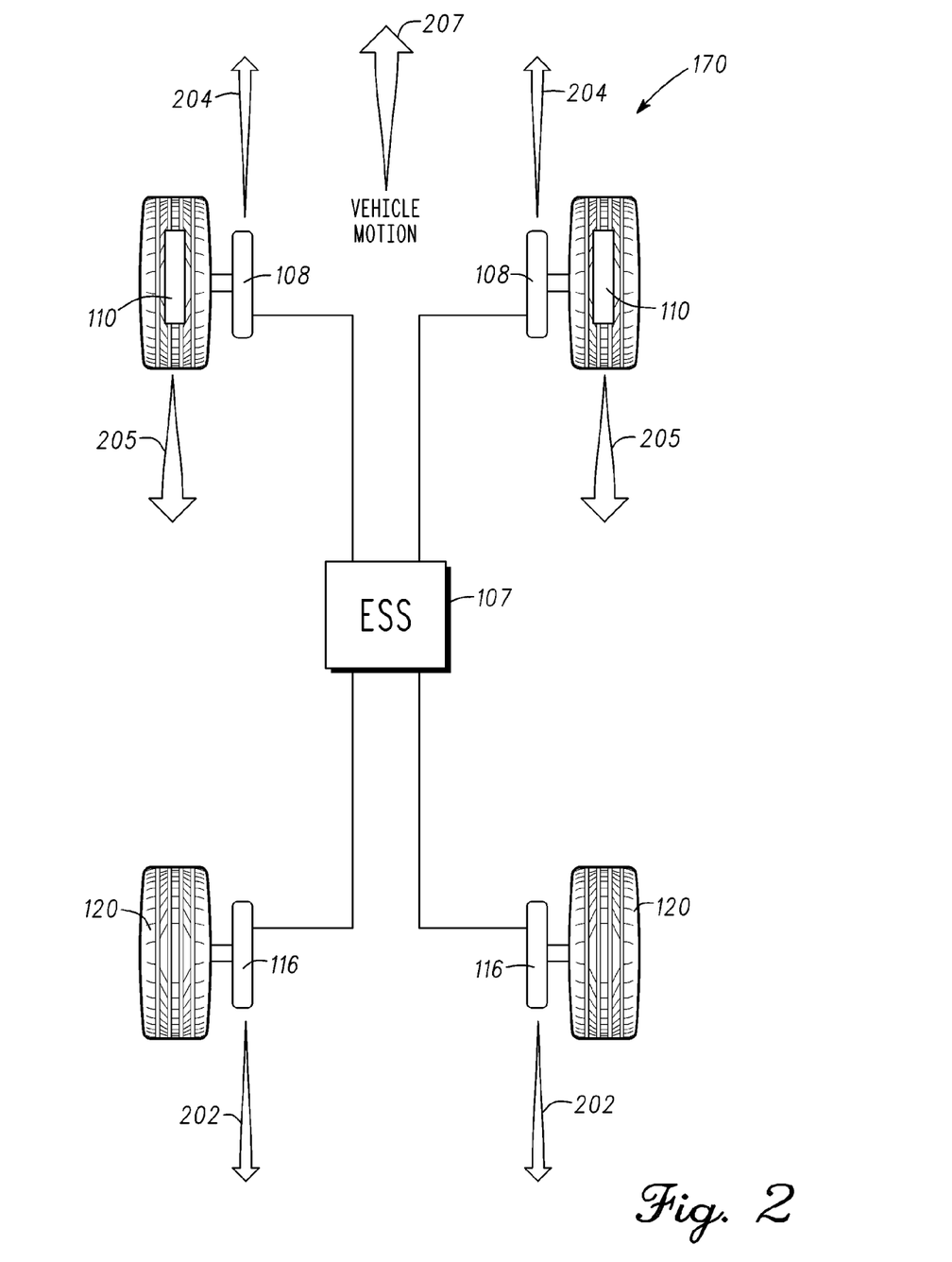
FIG. 2 is a functional block diagram of a sub-system of the braking system of FIG. 1, including an energy storage system, front motors, rear motors, front braking components, rear braking components, front wheels, and rear wheels, in accordance with an exemplary embodiment.

The front motors 108 are electrically coupled to the controller 106 and the front braking components 110 and are further coupled to the energy storage system 107. The front motors 108 are mechanically coupled to the front wheels 112 along the front axle 114 and provide power or torque to the front wheels 112 using energy from the energy storage system 107 when propelling the vehicle. When braking along the front axle 114, the front motors 108 recapture kinetic energy, converting it to electrical energy and transferring said energy to the energy storage system 107, provided that the energy storage system 107 can accept additional electrical energy. During an event in which regenerative braking alone is inadequate, additional braking torque is achieved by utilizing the front friction braking components 110. As depicted in FIG. 2, the braking system 100 preferably includes two front motors 108, one for each of the front wheels 112.

The rear motors 116 are electrically coupled to the controller 106 and are further coupled to the energy storage system 107. The rear motors 116 are mechanically coupled to the rear wheels 120 along the rear axle 122, but do not include rear friction brake components. When braking along the rear axle 122, the rear motors 116 recapture kinetic energy, converting it to electrical energy and transferring said energy to the energy storage system 107 based on instructions provided by the controller 106, provided that the energy storage system 107 can accept additional electrical energy. In circumstances in which the energy storage system 107 cannot accept additional electrical energy, regenerative energy from the rear motors 116 is instead transferred to the front motors 108 via instructions provided by the controller 106 thus providing a propulsion torque for dissipation of the electrical energy via friction braking of the front friction braking components 110. Accordingly, regenerative braking is provided along the rear axle 122 even when the energy storage system 107 cannot accept additional electrical energy. As depicted in FIG. 2, the braking system 100 preferably includes two rear motors 116, one for each of the rear wheels 120.

The front friction braking components 110 are mechanically coupled between the front motors 108 and the front wheels 112 along the front axle 114. The front friction braking components 110 provide braking for the wheels along the front axle 114 based on instructions provided by the controller 106. As depicted in FIG. 2, the braking system 100 preferably includes two front friction brake components 110.

The front motor sensors 132 are coupled to one or more of the front motors 108, and measure power or torque thereof during operation of the vehicle. The rear motor sensors 136 are coupled to one or more of the rear motors 116, and measure power or torque thereof during operation of the vehicle. The measurements (and/or information related thereto) from the front and/or rear motor sensors 132, 136 are provided to the controller 106 for processing and for calculation of an amount of propulsion and braking torque resulting from the front motors 108 and rear motors 116 when the energy storage system 107 cannot accept additional electrical energy.

The front wheel sensors 134 are coupled to one or more of the front wheels 112, and measure one or more speeds and/or movements thereof during operation of the vehicle. The rear wheel sensors 138 are coupled to one or more of the rear wheels 120, and measure one or more speeds and/or movements thereof during operation of the vehicle. The measurements (and/or information related thereto) from the front and/or rear wheel sensors 134, 138 are provided to the controller 106 for processing and for calculation of the amount of propulsion or braking torque required for proper front wheel 112 and rear wheel 120 control.

In certain embodiments, the processor 152 calculates the amount of propulsion or braking required using information from the motor sensors 132, 136 and the wheel sensors 134, 138. In other embodiments, the processor 152 calculates the amount of propulsion using information from the motor sensors 132, 136 but not the wheel sensors 134, 138, or vice versa, and/or from one or more other different types of sensors and/or devices.

FIG. 2 provides a functional block diagram of a portion of the braking system 100 of FIG. 1, in accordance with an exemplary embodiment. Specifically, FIG. 2 depicts the sub-system 170 of the braking system 100 as denoted in FIG. 1, representing the energy storage system 107, the front motors 108, the front friction braking components 110, the front wheels 112, the rear motors 116, and the rear wheels 120. The sub-system 170 is depicted in FIG. 2 in accordance with conditions in which the vehicle is operating and the energy storage system 107 cannot accept additional electrical energy. FIG. 2 also depicts a vehicle motion 201, a regenerative braking torque 202, a propulsion torque 204, and a friction braking torque 205.

As denoted in FIG. 2, regenerative braking torque 202 is provided by the rear motors 116. The electrical energy generated as a result of the regenerative braking torque 202 is transferred from the rear motors 116 to the front motors 108 via instructions provided by the controller 106, thereby resulting in propulsion torque 204 of the vehicle via the front motors 108 and the front wheels 112. The energy associated with the propulsion torque 204 is dissipated via friction braking torque 205 provided by the front friction braking components 110. As shown in FIG. 2, under these conditions, the friction braking torque 205 is greater than the regenerative braking torque 202, because the friction braking torque 205 counteracts the propulsion torque 204 (to thereby dissipate the electrical energy from the regenerative braking 202) in addition to providing a portion of the driver intended braking torque that is required along the front axle 114.

Figure 3:
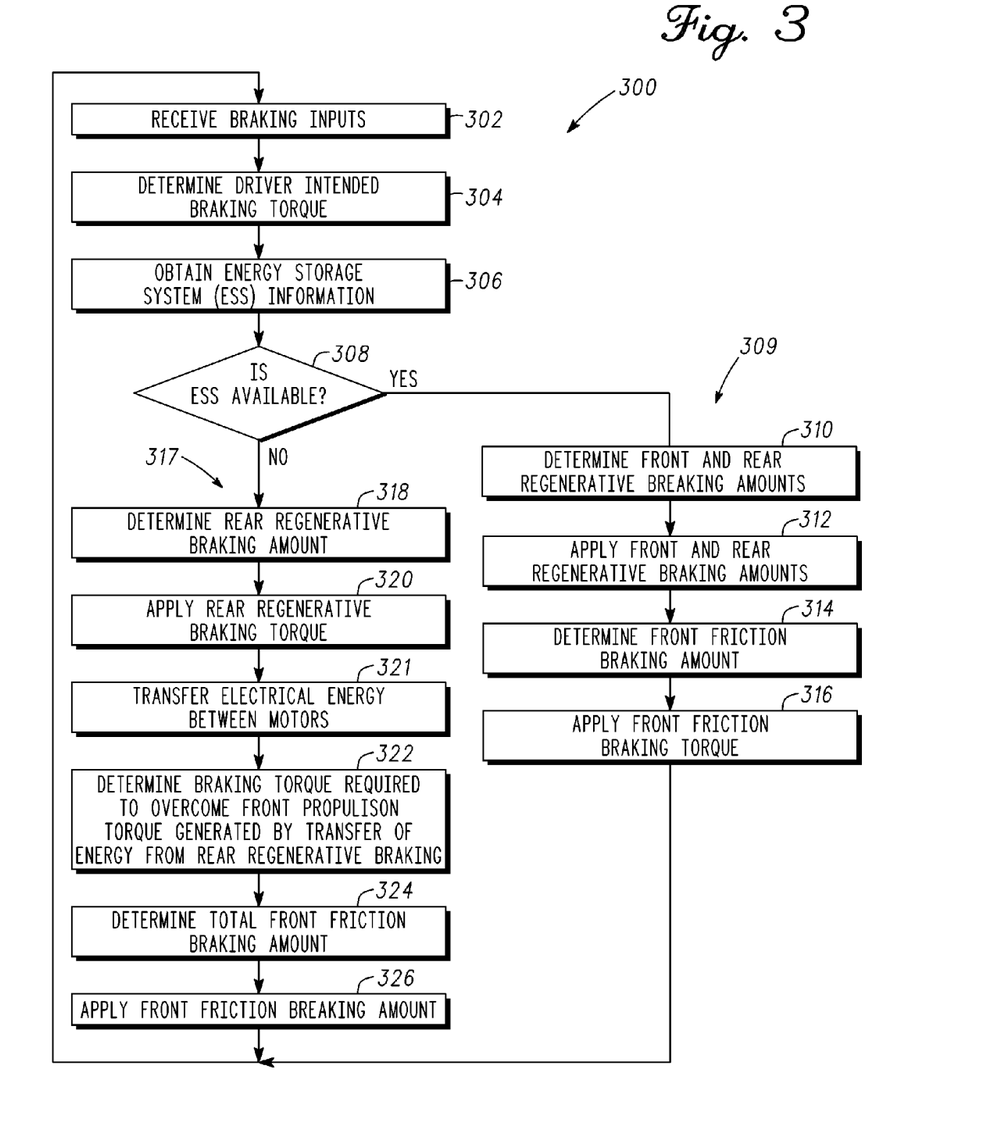
FIG. 3 is a flowchart of a process for controlling braking and dissipating electrical energy from regenerative braking in a vehicle under various conditions, including conditions in which an energy storage system of the vehicle cannot accept additional electrical energy, and that can be utilized in connection with the braking system of FIG. 1 and the sub-system of FIG. 2, in accordance with an exemplary embodiment.

FIG. 3 is a flowchart of a process 300 for controlling braking in a vehicle, in accordance with an exemplary embodiment. The process 300 provides regenerative and friction braking in accordance with a driver requested braking torque, and allows for dissipation of electrical energy from regenerative braking when an energy storage system of the vehicle cannot accept additional electrical energy. The process 300 can be implemented in connection with the braking system 100 of FIG. 1 and the sub-system of FIG. 2.

As depicted in FIG. 3, the process 300 begins with the step of receiving braking inputs (step 302). The braking inputs preferably pertain to values pertaining to engagement of the brake pedal 102 by a driver of the vehicle. Specifically, the braking inputs preferably include values of brake pedal travel and/or brake pedal force as obtained by the brake pedal sensors 104 of FIG. 1 and provided to the processor 152 of FIG. 1. The braking inputs are received and obtained, preferably continually, at different points or periods in time throughout a braking event for the vehicle. During each iteration of the process 300, the processor 152 of FIG. 1 preferably processes the current or instantaneous values of these variables for use in the calculations and determinations performed by the processor 152 of FIG. 1 and for ultimate use in controlling braking for the vehicle.

A driver intended braking torque is determined (step 304). The driver intended braking torque is determined by the processor 152 of FIG. 1 using the braking inputs of step 302 and one or more look-up tables 164 stored in the memory 154 of FIG. 1. The driver intended braking torque is determined, preferably continuously, at different points or periods in time throughout the braking event. During each iteration of the process 300, the processor 152 of FIG. 1 preferably processes the current or instantaneous values of this variable for use in the calculations and determinations performed by the processor 152 of FIG. 1 and for ultimate use in controlling braking for the vehicle.

Information is obtained regarding the energy storage system (step 306). In one embodiment, during step 306, the ESS sensor 130 of FIG. 1 provides information as to a state of the energy storage system 107 of FIG. 1 (for example, whether the energy storage system 107 is offline, an amount of electrical energy already stored in the energy storage system 107, an electrical energy storage capacity of the energy storage system 107, or the like), and provides this information to the processor 152 of FIG. 1 for processing. The energy storage system information is provided, preferably continuously, at different points or periods in time throughout the braking event. During each iteration of the process 300, the processor 152 of FIG. 1 preferably processes the current or instantaneous values of these variables for use in the calculations and determinations performed by the processor 152 of FIG. 1 and for ultimate use in controlling braking for the vehicle.

A determination is then made as to whether the energy storage system is available to accept additional electrical energy (step 308). The energy storage system may be unable to accept additional electrical energy, for example, if the energy storage system is offline, is not operating correctly, or is full to its capacity with electrical energy. The determination of step 308 is preferably performed by the processor 152 of FIG. 1 with respect to the energy storage system 107 of FIG. 1 using the energy storage system information from step 306. This determination is made, preferably continuously, at different points or periods in time throughout the braking event. During each iteration of the process 300, the processor 152 of FIG. 1 preferably processes the current or instantaneous values of these variables for use in the calculations and determinations performed by the processor 152 of FIG. 1 and for ultimate use in controlling braking for the vehicle.

If it is determined in step 310 that the energy storage system is available to accept additional electrical energy, then the process proceed along a first path 309, as front and rear regenerative braking amounts are determined (step 310). The front and rear regenerative braking amounts are preferably determined by the processor 152 of FIG. 1 with respect to the available torque capacity of the front motor 108 and rear motor 116 of FIG. 1. In one embodiment, a sum of the front and rear regenerative braking amounts is equal to a capacity for regenerative braking for the vehicle based on how much additional electrical energy the energy storage system 107 of FIG. 1 can accept. The front and rear regenerative braking amounts are also based upon the driver intended braking torque of step 304, for example in that the sum of the front and rear regenerative braking amounts is less than or equal to the driver intended braking torque. The front and rear regenerative braking amounts are determined, preferably continuously, at different points or periods in time throughout the braking event. During each iteration of the process 300, the processor 152 of FIG. 1 preferably processes the current or instantaneous values of these variables for use in the calculations and determinations performed by the processor 152 of FIG. 1 and for ultimate use in controlling braking for the vehicle.

The front and rear regenerative braking torque are applied (step 312). Preferably the front and rear regenerative braking torque are applied by the front motors 108 and the rear motors 116, respectively, of FIG. 1, with amounts that are substantially equal to the front and rear regenerative braking amounts, respectively, of step 310. The front and rear regenerative braking torque are provided in accordance with instructions provided by the processor 152 of FIG. 1, and are preferably provided continuously throughout the braking event.

In addition, a front friction braking amount is determined (step 314). The front friction amount is preferably determined by the processor 152 of FIG. 1 with respect to the front friction braking components 110 of FIG. 1 based on the driver intended braking torque of step 304 and the front and rear regenerative braking amounts applied in step 312. Specifically, during step 314, the front friction braking amount is substantially equal to the driver intended braking torque of step 304 minus the sum of the front and rear regenerative braking amounts applied in step 312. The front friction braking amount is determined, preferably continuously, at different points or periods in time throughout the braking event. During each iteration of the process 300, the processor 152 of FIG. 1 preferably processes the current or instantaneous values of this variable for us in the calculations and determinations performed by the processor 152 of FIG. 1 and for ultimate use in controlling braking for the vehicle.

The front friction braking torque is applied (step 316). Preferably, the front friction braking torque is applied by the front friction braking components 110 of FIG. 1 with an amount that is substantially equal to the front friction braking amount of step 314. The front friction braking torque is provided in accordance with instructions provided by the processor 152 of FIG. 1, and is preferably provided continuously throughout the braking event. Following step 316, the process preferably returns to step 302, and the steps of the process repeat in a new iteration.

Alternatively, if it is determined in step 310 that the energy storage system is not available to accept additional electrical energy, then the process proceeds along a second path 317, as a rear regenerative braking amount is determined (step 318). The rear regenerative braking amount is preferably determined by the processor 152 of FIG. 1 with respect to the rear motor 116 of FIG. 1. In one embodiment, the rear regenerative braking amount is equal to a desired amount of braking along the rear axle 122 of FIG. 1 based upon the driver intended braking torque of step 304. The rear regenerative braking amount is determined, preferably continuously, at different points or periods in time throughout the braking event. During each iteration of the process 300, the processor 152 of FIG. 1 preferably processes the current or instantaneous values of this variable for use in the calculations and determinations performed by the processor 152 of FIG. 1 and for ultimate use in controlling braking for the vehicle.

The rear regenerative braking torque is applied (step 320). Preferably the rear regenerative braking torque is applied by the rear motors 116 in an amount that is substantially equal to the rear regenerative braking amount of step 318. The rear regenerative braking torque is provided by the rear motors 116 of FIG. 1 in accordance with instructions provided by the processor 152 of FIG. 1, and is preferably provided continuously throughout the braking event. During step 320 and throughout the second path 317, regenerative braking is only applied along the rear axle 122 of FIG. 2.

In addition, the electrical energy resulting from the rear regenerative braking of step 320 is transferred from the rear motors to the front motors (step 321). During step 321, the processor 152 of FIG. 1 preferably provides instructions for the transfer of the electrical energy from the rear motors 116 of FIG. 1 to the front motors 108 of FIG. 1 for dissipation via friction braking along the front axle 114. The electrical energy transfer is conducted, preferably continuously, throughout the braking even under conditions corresponding to the second path 317 in which the energy storage system cannot accept additional electrical energy. The electrical energy is preferably transferred continuously throughout the braking event.

A determination is made as to an amount of propulsion torque resulting from the rear regenerative braking of step 320 and the electrical energy transfer of step 321 (step 322). The amount of propulsion torque is preferably determined by the processor 152 of FIG. 1 using information provided by one or more of the front wheel sensors 134, the rear wheel sensors 138, the front motor sensors 132, and/or the rear motor sensors 136. For example, in one embodiment, the processor 152 of FIG. 1 determines the amount of propulsion torque using values provided by one or more of the front motor sensors 132 and/or the rear motor sensors 136. By way of additional example, in another embodiment, the processor 152 of FIG. 1 determines the amount of propulsion using wheel movement values provided by one or more of the front wheel sensors 134 and/or the rear wheel sensors 138. The amount of propulsion is determined, preferably continuously, at different points or periods in time throughout the braking event. During each iteration of the process 300, the processor 152 of FIG. 1 preferably processes the current or instantaneous values of this variable for use in the calculations and determinations performed by the processor 152 of FIG. 1 and for ultimate use in controlling braking for the vehicle.

In addition, a front friction braking amount is determined (step 324). The front friction amount is preferably determined by the processor 152 of FIG. 1 with respect to the front friction braking components 110 of FIG. 1 based on the driver intended braking torque of step 304 and the amount of propulsion of step 322. Specifically, the front friction braking amount of step 324 counteracts the propulsion of step 322 and also provides any additional amounts of the driver intended braking torque of step 304 that is required along the front axle 114. The front friction braking amount is determined, preferably continuously, at different points or periods in time throughout the braking event. During each iteration of the process 300, the processor 152 of FIG. 1 preferably processes the current or instantaneous values of this variable for use in the calculations and determinations performed by the processor 152 of FIG. 1 and for ultimate use in controlling braking for the vehicle.

The front friction braking torque is applied (step 326). Preferably, the front friction braking torque is applied by the front friction braking components 110 of FIG. 1 with an amount that is substantially equal to the front friction braking amount of step 324. The front friction braking torque is provided in accordance with instructions provided by the processor 152 of FIG. 1, and is preferably provided continuously throughout the braking event. Following step 326, the process preferably returns to step 302, and the steps of the process repeat in a new iteration.

Accordingly, improved methods and systems are provided for controlling braking of vehicles, such as electric, hybrid electric, or fuel cell vehicle applications. For example, the improved methods and systems provide regenerative and friction braking in accordance with a driver requested braking torque, and allow for dissipation of electrical energy from regenerative braking when an energy storage system of the vehicle cannot accept additional electrical energy.

It will be appreciated that the disclosed methods and systems may vary from those depicted in the Figures and described herein. For example, the braking system 100 and/or various components thereof may vary from those depicted in FIGS. 1 and 2 and/or described above in connection therewith. Moreover, the braking system 100 and/or the controller 106 may be disposed in whole or in part in any one or more of a number of different vehicle units, devices, and/or systems. In addition, it will be appreciated that certain steps of the process 300 may vary from those depicted in FIG. 3 and/or described herein in connection therewith. It will similarly be appreciated that certain steps of the process 300 may occur simultaneously or in a different order than that depicted in FIG. 3 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

We claim:

1. A method for controlling braking in a vehicle having an energy storage system, a regenerative braking component, and a friction braking component, the method comprising the steps of:
   providing regenerative braking;
   determining an amount of propulsion torque resulting from the regenerative braking if the energy storage system cannot accept additional electrical energy; and
   providing friction braking based in part upon the amount of propulsion torque if the energy storage system cannot accept a predetermined amount of additional electrical energy.

2. The method of claim 1, wherein the vehicle has a plurality of wheels, and the step of determining the amount of propulsion torque comprises the step of determining the amount of propulsion torque based on movement of the plurality of wheels.

3. The method of claim 1, wherein the vehicle includes a first motor providing the regenerative braking component and a second motor coupled to the friction braking component, and the method further comprises the step of:
   transferring energy from the regenerative braking from the first motor to the second motor.

4. The method of claim 3, further comprising the step of:
   generating the propulsion torque using the transferred energy from the regenerative braking.

5. The method of claim 4, wherein the step of determining the amount of propulsion torque comprises the step of measuring the amount of propulsion torque using a sensor coupled to the second motor.

6. The method of claim 1, wherein:
   the vehicle includes a front axle and a rear axle;
   the regenerative braking is provided on the front axle and the rear axle if the energy storage system can accept the predetermined amount of additional electrical energy;
   the regenerative braking is provided on the rear axle and not on the front axle if the energy storage system cannot accept the predetermined amount of additional electrical energy; and
   the friction braking is provided on the front axle and not on the rear axle.

7. The method claim 1, further comprising the steps of:
   receiving an input from a driver of the vehicle; and
   determining a requested braking torque;
   wherein the regenerative braking and the friction braking are based at least in part on the requested braking torque.

8. A system for controlling braking in a vehicle having an energy storage system, the system comprising:
   a motor configured to provide regenerative braking based on regenerative braking instructions;
   a friction braking component configured to provide friction braking based on friction braking instructions; and
   a controller coupled to the motor and the friction braking component and configured to:
     provide the regenerative braking instructions to the motor;
     determine an amount of propulsion torque resulting from the regenerative braking if the energy storage system cannot accept a predetermined amount of additional electrical energy; and
     provide the friction braking instructions to the friction braking component based in part upon the amount of propulsion torque if the energy storage system cannot accept the predetermined amount of additional electrical energy.

9. The system of claim 8, wherein the vehicle has a plurality of wheels, and the system further comprises:
   a sensor coupled to one of the plurality of wheels and configured to measure movement thereof;
   wherein the controller is coupled to the sensor and configured to determine the amount of propulsion torque based on the movement.

10. The system of claim 8, further comprising:
    a second motor coupled to the friction braking component;
    wherein the controller is coupled to the motor and the second motor and configured to transfer regenerative braking energy from the motor to the second motor to generate the propulsion torque.

11. The system of claim 10, further comprising:
    a sensor coupled to the motor, the second motor, or both, the sensor configured to measure the transferred regenerative braking energy, wherein the controller is coupled to the sensor and is further configured to determine the amount of propulsion torque based on the transferred regenerative braking energy.

12. The system of claim 10, wherein:
    the vehicle includes a front axle and a rear axle;
    the regenerative braking is provided on the front axle and the rear axle if the energy storage system can accept the predetermined amount of additional electrical energy; and
    the regenerative braking is provided on the rear axle and not on the front axle if the energy storage system cannot accept the predetermined amount of additional electrical energy.

13. The system of claim 12, wherein the friction braking is provided on the front axle and not on the rear axle.

14. The system of claim 8, wherein the vehicle includes a brake pedal, and the system further comprises:

a sensor coupled to the brake pedal and configured to detect an input applied to the brake pedal;

wherein the controller is coupled to the sensor and is further configured to:

determine a requested braking torque using the input; and provide the regenerative braking instructions and the friction braking instructions based at least in part on the requested braking torque.

15. A system for controlling braking in a vehicle having a first axle and a second axle, the system comprising:

an energy storage system;

a motor configured to provide regenerative braking based on regenerative braking instructions;

a friction braking component configured to provide friction braking based on friction braking instructions; and a controller in operative communication with the energy storage system, the motor, and the friction braking component and configured to:

provide the regenerative braking instructions to the motor;

determine an amount of propulsion torque resulting from regenerative braking energy if the energy storage system cannot accept additional electrical energy; and provide the friction braking instructions to the friction braking component based in part upon the amount of propulsion torque if the energy storage system cannot accept additional electrical energy.

16. The system of claim 15, wherein the vehicle has a plurality of wheels, and the system further comprises:

a sensor coupled to one of the plurality of wheels and configured to measure movement thereof;

wherein the controller is coupled to the sensor and configured to determine the amount of propulsion torque based on the movement.

17. The system of claim 15, further comprising:

a second motor coupled to the friction braking component;

wherein the controller is coupled to the motor and the second motor and configured to transfer the regenerative braking energy from the motor to the second motor to generate the propulsion torque.

18. The system of claim 17, further comprising:

a sensor configured to measure the regenerative braking energy transferred from the motor to the second motor;

wherein the controller is coupled to the sensor and is further configured to determine the amount of propulsion torque based on the regenerative braking energy.

19. The system of claim 15, wherein:

the vehicle includes a front axle and a rear axle;

the friction braking is provided on the front axle and not on the rear axle;

the regenerative braking is provided on the front axle and the rear axle if the energy storage system can accept additional electrical energy; and the regenerative braking is provided on the rear axle and not on the front axle if the energy storage system cannot accept additional electrical energy.

20. The system of claim 15, wherein the vehicle includes a brake pedal, and the system further comprises:

a sensor coupled to the brake pedal and configured to detect an input applied to the brake pedal;

wherein: the controller is coupled to the sensor and is further configured to:

determine a requested braking torque using the input; and provide the regenerative braking instructions and the friction braking instructions based at least in part on the requested braking torque.

\* \* \* \* \*